(12) United States Patent
Gerke

(10) Patent No.: US 7,950,729 B2
(45) Date of Patent: May 31, 2011

(54) MACHINE GROUP AND METHOD FOR MAKING MACHINES

(75) Inventor: Clifton Gerke, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 317 days.

(21) Appl. No.: 11/998,225

(22) Filed: Nov. 29, 2007

(65) Prior Publication Data

US 2009/0140550 A1 Jun. 4, 2009

(51) Int. Cl.
*B60J 7/00* (2006.01)
(52) U.S. Cl. ................................... 296/193.07
(58) Field of Classification Search ............ 296/193.07, 296/190.05, 35.1
See application file for complete search history.

(56) References Cited

U.S. PATENT DOCUMENTS

| | | | |
|---|---|---|---|
| 3,321,236 A * | 5/1967 | Sewelin | 296/35.1 |
| 3,554,596 A * | 1/1971 | Fevre | 296/190.05 |
| 3,734,223 A | 5/1973 | Anderson | |
| 3,809,427 A * | 5/1974 | Bennett | 296/35.1 |
| 3,990,737 A * | 11/1976 | Palmer | 296/35.1 |
| 4,061,392 A * | 12/1977 | Lowder et al. | 296/190.03 |
| 4,210,362 A * | 7/1980 | Boersma | 296/190.07 |
| 4,286,777 A | 9/1981 | Brown | |
| 4,422,685 A | 12/1983 | Bonfilio et al. | |
| 4,440,437 A * | 4/1984 | Hahm et al. | 296/190.05 |
| 4,842,326 A | 6/1989 | DiVito | |
| 4,968,087 A | 11/1990 | Goria | |
| 5,127,698 A * | 7/1992 | Konig | 296/35.1 |
| 5,205,587 A | 4/1993 | Orr | |
| 5,282,661 A * | 2/1994 | Arnberger | 296/190.04 |
| 5,573,300 A | 11/1996 | Simmons | |
| 5,641,153 A * | 6/1997 | Gwinn | 267/294 |
| 5,707,048 A | 1/1998 | Kuzukawa et al. | |
| 5,769,191 A | 6/1998 | Cole, Jr. et al. | |
| 5,865,264 A | 2/1999 | Glass et al. | |
| 6,000,703 A * | 12/1999 | Schubert et al. | 280/5.518 |
| 6,030,016 A * | 2/2000 | Rice | 296/35.1 |
| 6,374,935 B1 | 4/2002 | Kirschenmann et al. | |
| 6,540,283 B1 * | 4/2003 | Johansson et al. | 296/190.05 |
| 6,588,820 B2 * | 7/2003 | Rice | 296/35.1 |
| 6,986,545 B2 | 1/2006 | Nilsson et al. | |
| 2006/0091718 A1 | 5/2006 | Thomas | |
| 2009/0140550 A1 * | 6/2009 | Gerke | 296/193.04 |
| 2009/0167057 A1 * | 7/2009 | Walter et al. | 296/190.03 |

* cited by examiner

*Primary Examiner* — Kiran B. Patel
(74) *Attorney, Agent, or Firm* — Liell & McNeil

(57) ABSTRACT

A method for making machines includes selecting one of a plurality of types of suspension elements for coupling between a body component and a frame component of a machine. If the suspension elements are of a first type, they are coupled with mounting elements on the body component having a configuration corresponding therewith. If the suspension elements are of a second type, they are coupled with mounting elements on the frame component which have a configuration corresponding therewith. Adapter mechanisms having a first connecting interface corresponding to mounting elements on one of the body component and frame component, and a second connecting interface corresponding with the selected suspension elements, are used to couple the body component with the frame component. A group of machines includes a first set using the first type of suspension elements coupled between the body component and frame component, and a second machine set which includes the second type of suspension elements coupled between a body component and frame component.

8 Claims, 3 Drawing Sheets

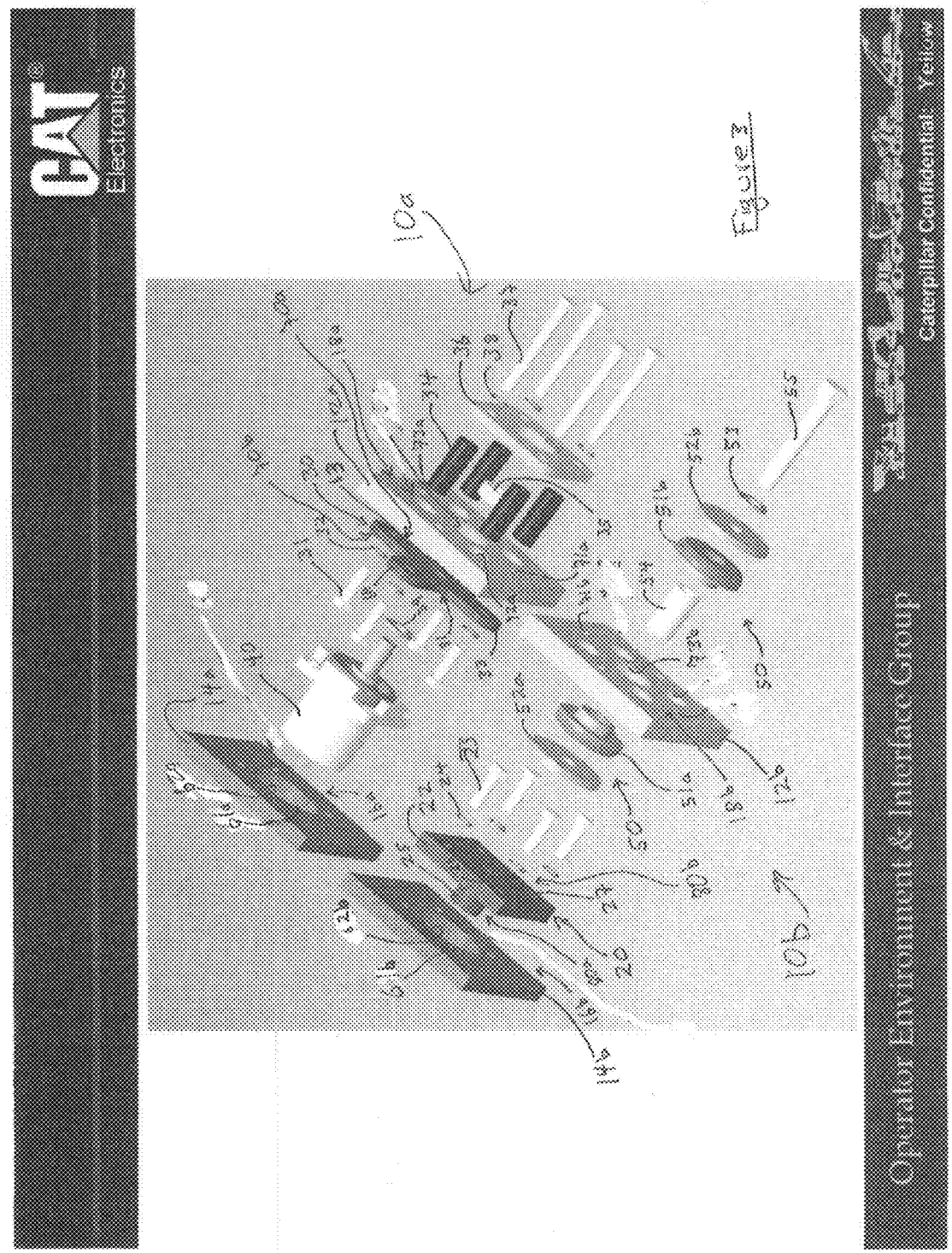

MACHINE GROUP AND METHOD FOR MAKING MACHINES

TECHNICAL FIELD

The present disclosure relates generally to methods for making machines and groups of machines, and relates more particularly to such a method using specialized mounting hardware to adapt body or frame components of machines to couple with different types of suspension elements.

BACKGROUND

Many different machine designs and methods are known which enable machines of similar or identical types to be made to customer specifications. It is desirable in many instances to provide customers with a variety of hardware and operating options in connection with a finished product. The reasons for such flexibility may be a desire for a range of pricing options, optional hardware for different machine applications and other factors such as jurisdictional requirements. In the context of construction machines and the like, a manufacturer may wish to design certain machines to have a standard basic platform, but provide options to add, subtract, or substitute certain parts upon request.

One challenge in providing different hardware options for a finished product is the difficulty in designing a machine platform which can accommodate different hardware without creating significant cost issues or sacrificing performance. Many machines, notably machines of the type used in construction, forestry, mining and similarly rugged environments need to be relatively ruggedly built. To this end, hardware used to couple various of the machine components together tend to be relatively robust, and primary components of the machines such as frames and bodies are typically purpose built for specific hardware.

In one example, machines intended for use in off-highway or in similarly demanding applications often have an operator cab which is manufactured separately from a frame, then coupled with the frame by way of a suspension. The suspension typically absorbs certain shocks and vibrations rather than transmitting them to the operator within the cab. One cab mounting/suspension apparatus is known from U.S. Pat. No. 6,374,935 B1 to Kirschenmann et al. Various jurisdictional requirements exist which mandate that certain machines be able to withstand rollovers and other relatively traumatic events. Mounting strategies for coupling the operator cab with the frame have traditionally been relatively inflexible to avoid compromising integrity of the connections between the respective components. As such, providing customer options for different suspensions has heretofore been challenging apart from designing different machine platforms purpose built for a specific type of suspension.

The present disclosure is directed to one or more of the problems or shortcomings set forth above.

SUMMARY

In one aspect, a method for making machines includes a step of selecting one of a plurality of types of suspension elements for coupling between a body component and a frame component of a machine. The method further includes a step of, if the suspension elements are of a first type, coupling the suspension elements with mounting elements on the body component having a configuration which corresponds with the first type of suspension elements but not a second type of suspension elements. The method further includes a step of, if the suspension elements are of the second type, coupling the suspension elements with mounting elements on the frame component having a configuration which corresponds with the second type of suspension elements but not the first type of suspension elements. The method still further includes the step of mounting the body component on the frame component at least in part via a step of coupling one of the body component and frame component with the selected suspension elements via adapter mechanisms each having a first connecting interface which corresponds with the mounting elements of one of the body component and frame component, and a second connecting interface which corresponds with selected suspension elements.

In another aspect, a group of machines includes a first machine set which includes at least one machine having a first body component, a first frame component and suspension elements of a first type coupled between the first body component and the first frame component. The group of machines further includes a second machine set which includes at least one other machine having a second body component and a second frame component, the at least one other machine including suspension elements of a second, different type coupled between the second body component and the second frame component. Each of the first and second body components includes mounting elements with a configuration corresponding to the first type of suspension elements but not the second type and each of the first and second frame components includes mounting elements with a configuration corresponding to the second type of suspension elements but not the first type.

In still another aspect, a kit for replacing a suspension element of a machine coupled between an operator cab and a frame of the machine includes a replacement suspension element having a vibration isolation device. The replacement suspension element has a configuration which corresponds to mounting elements of one of the operator cab and the frame but does not correspond with mounting elements of the other of the operator cab and the frame. The kit further includes an adapter mechanism configured to mate the replacement suspension element with the mounting elements of the other of the operator cab and the frame. The adapter mechanism includes an adapter plate having a first connecting interface which includes a set of apertures configured to register with apertures of the mounting elements of the other of the operator cab and the frame, and a second connecting interface having a configuration which corresponds with the suspension element for coupling the suspension element with the adapter plate.

BRIEF DESCRIPTION OF THE DRAWINGS

FIG. 3 is an exploded view of components similar to those shown in FIG. 2.

DETAILED DESCRIPTION

Figure 1:
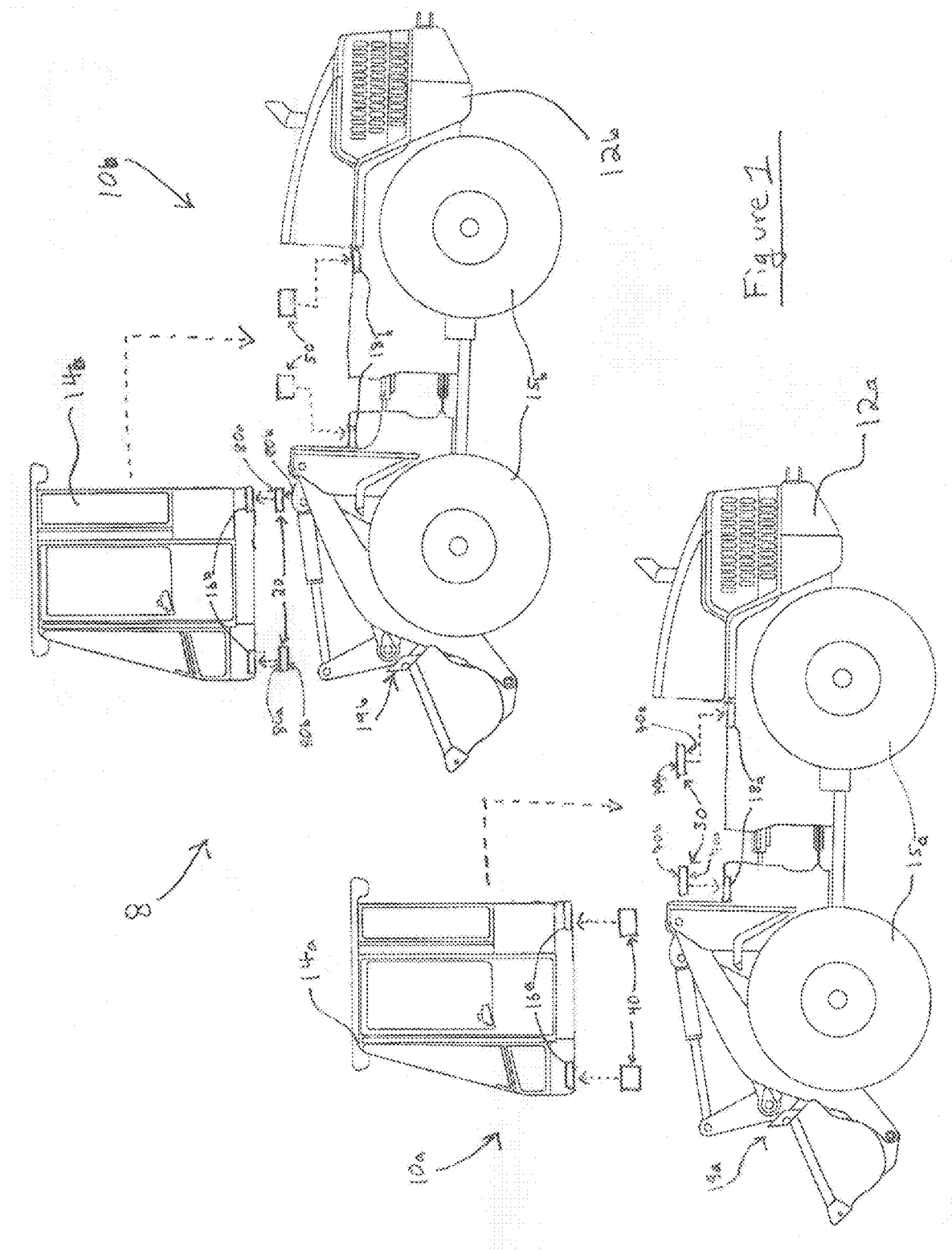
FIG. 1 is a side diagrammatic view of a group of partially assembled machines according to one embodiment.

Referring to FIG. 1, there is shown a group of machines 8 according to the present disclosure, including a first machine 10a and a second machine 10b. In one embodiment, machines 10a and 10b may include identical body components such as operator cabs 14a and 14b, respectively. Machines 10a and 10b may further include identical frame components, or "frames," 12a and 12b, respectively. Each of machines 10a and 10b may be a wheel loader having a set of ground engaging wheels 15a and 15b coupled with frames 12a and 12b, respectively. Each of machines 10a and 10b may further include an implement system 19a and 19b, respectively, coupled with their corresponding frames 12a and 12b. In other embodiments, machine group 8 might include machines other than wheel loaders, such as track-type machines, wheel tractors, excavators, trucks or any of a variety of other machines. In still other embodiments, machines 10a and 10b need not be wholly identical, and operator cabs 14a and 14b or frames 12a and 12b might differ in certain respects. Machines 10a and 10b will typically differ based upon the strategy by which operator cabs 14a and 14b (hereinafter "cabs") are mounted to and coupled with their corresponding frames 12a and 12b.

Each of cabs 14a and 14b may include a first set of mounting elements 16a and 16b, respectively, whereas each of frames 12a and 12b may include a second set of mounting elements 18a and 18b, respectively. In the example embodiment illustrated in FIG. 1, machine 10a includes a first type of suspension elements 40, whereas machine 10b includes a second type of suspension elements 50 which are different from suspension elements 40. Mounting elements 16a and 16b may have a configuration which corresponds with suspension elements 40 but does not correspond with suspension elements 50. Stated another way, mounting elements 16a and 16b may be purpose built to couple directly with suspension elements 40 but are not purpose built to couple directly with suspension elements 50. Mounting elements 18a and 18b may have a configuration which corresponds with suspension elements 50 but does not correspond with suspension elements 40. In other words, mounting elements 18a and 18b may be purpose built to couple directly with suspension elements 50 but are not purpose built to couple directly with suspension elements 40. It may thus be noted that cabs 14a and 14b may be specifically designed to couple with a different type of suspension elements than are frames 12a and 12b. As will be further apparent from the following description, designing machines 10a and 10b to have non-corresponding mounting elements on their respective cabs 14a and 14b versus their frames 12a and 12b allows different suspension elements to be selected for coupling between cabs 14a and 14b and frames 12a and 12b, respectively.

Accordingly, a customer may request that suspension elements of a first type, such as suspension elements 40, be provided on a first machine such as machine 10a. The same or another customer might request that suspension elements of a second, different type, such as suspension elements 50, be provided in connection with a second machine such as machine 10b. As alluded to above, selection of different components to be used in connection with a particular machine might vary based on the intended machine application, price or other factors such as compliance with jurisdictional standards. For instance, one jurisdiction might require a certain type of suspension elements, whereas a second jurisdiction might have no restrictions as to the type of suspension elements to be used with a particular machine.

Since mounting elements 16a, 16b are designed based on a different type of suspension element than that of mounting elements 18a, 18b, it will be desirable to provide a means for accommodating the difference in mounting element configurations. This is achieved by way of relatively simple adapter mechanisms which may be used in coupling cabs 14a and 14b with frames 12a and 12b, respectively. In particular, the adapter mechanisms described herein may be configured to mate one of the body component and frame component of a machine with suspension elements coupled between the body component and frame component. Machine 10a includes first adapter mechanisms 30 which have a first connecting interface 70a corresponding with mounting elements 18a, 18b, and a second connecting interface 70b corresponding with suspension elements 40. In other words, adapter mechanisms 30 may be purpose built to couple with mounting elements 18a, 18b, and also to couple with suspension elements 40. In contrast, machine 10b includes second adapter mechanisms 20 which have a third connecting interface 80a corresponding with mounting elements 16a, 16b, and a fourth connecting interface 80b corresponding with suspension elements 50.

As used herein, the term "corresponding with" should be understood to mean that the subject component, for example, adapter mechanisms 30 or 20, have structural features of a size, location, arrangement, number or shape which are dictated at least in part by the component for which they are purpose built. For instance, adapter mechanisms 30 may have structural features comprising connecting interface 70a which have a size, location, arrangement, number or shape dictated at least in part by the configuration of mounting elements 18a, 18b. Adapter mechanisms 30 may further have structural features comprising connecting interface 70b which have a size, location, arrangement, number or shape dictated at least in part by a configuration of suspension elements 40. Adapter mechanisms 20 may be analogously designed with regard to mounting elements 16a, 16b and suspension elements 50. In a related aspect, mounting elements 16a, 16b and 18a, 18b may have structural features which are dictated at least in part by a configuration of the mounting elements with which they are designed to directly couple, i.e. without needing an adapter mechanism. As will be further apparent from the following description, adapter mechanisms 20 and 30 can mate with the corresponding mounting elements 16a, 16b and 18a, 18b to attach suspension elements 50 and 40 respectively to mounting elements 16a, 16b and 18a, 18b.

Figure 2:
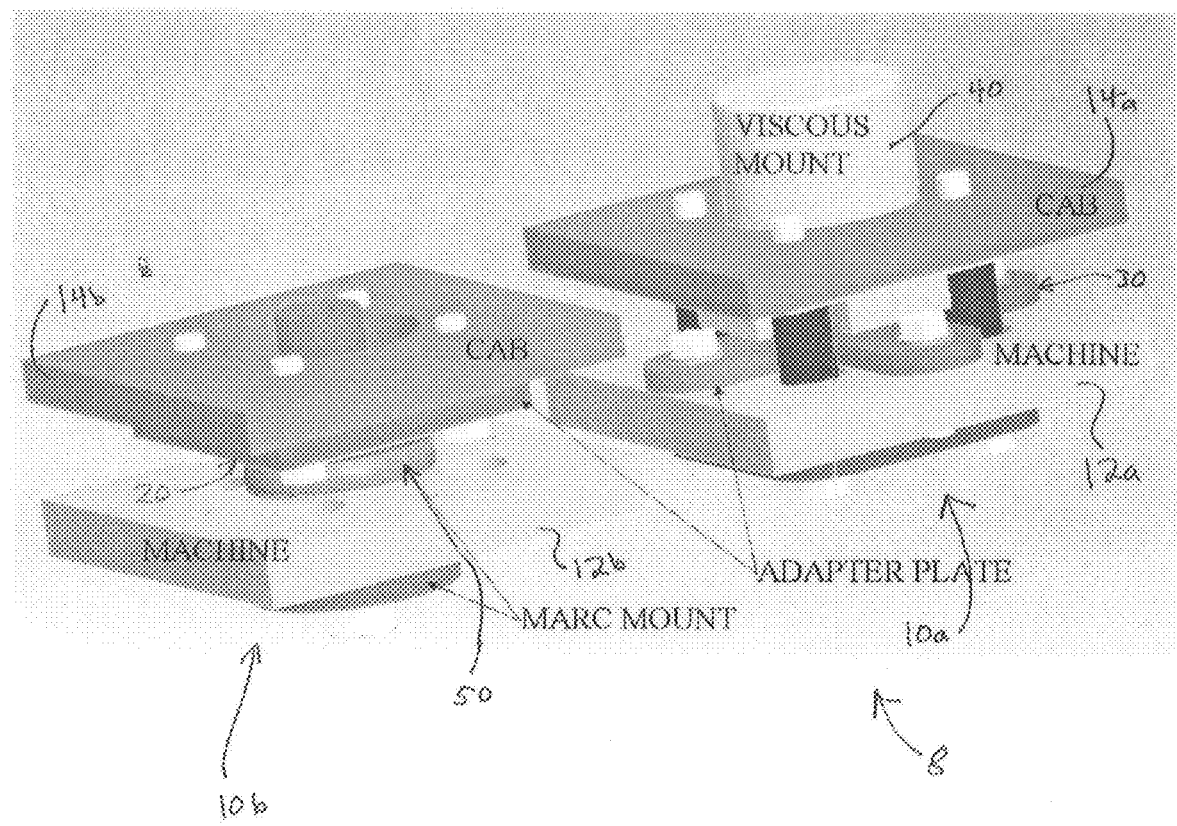
FIG. 2 is an isometric view of a portion of each of the machines shown in FIG. 1.

Turning now to FIG. 2, there are shown portions of machines 10a and 10b in which cabs 14a and 14b are mounted on frames 12a and 12b. In the case of machine 10a, it may be noted that a suspension element 40, which may comprise a viscous mount, is coupled directly with cab 14a, whereas suspension element 40 is coupled with frame 12a by way of an adapter mechanism 30. In the case of machine 10b, it may be noted that a suspension element 50, which may comprise a non-viscous mount of the type known in the art as a marc mount, is coupled directly to frame 12b, whereas suspension element 50 is coupled with cab 14b by way of an adapter mechanism 20. One practical implementation strategy of the present disclosure may be providing an option as to whether a particular machine is to be made with marc mounts or viscous mounts. In other embodiments, however, different types of vibration isolation mounts or other mounts might be used or made available as an option than those illustrated and described herein. It should further be appreciated that rather than providing an option as to what type of suspension elements are to be used in coupling an operator cab with a frame, different body components and/or different frame components might be used. For example, an open-air operator station might be coupled with a machine frame component by selecting suspension elements and coupling together the operator station and frame component in the manner described herein.

Turning now to FIG. 3, there are shown exploded views of portions of machines 10a and 10b, illustrating certain components in more detail. It may be noted that mounting elements 16a and 16b of each of operator cabs 14a and 14b include a center aperture 62a and 62b, respectively. Each of apertures 62a and 62b may comprise a circular aperture having a shape, location and/or width which corresponds with a shape, width, etc. of a suspension element 40, a viscous mount, also shown in FIG. 3. Suspension element 40 is thus configured to couple with either cab 14a or 14b at least in part by positioning within aperture 62a or 62b. In the illustrated embodiment, suspension element 40 is used with cab 14a. As mentioned above, suspension element 40 may be coupled with the corresponding frame 12a by way of an adapter mechanism 30, also shown in FIG. 3. It will be recalled that mounting elements 16a and 16b may be identical to one another, whereas mounting elements 18a, 18b may also be identical to one another. Accordingly, the present description of the manner in which suspension elements 40 and 50 are coupled with their corresponding body or frame component and coupled with their corresponding adapter mechanism should be understood as applicable to either of machines 10a or 10b. Likewise, the present description of mating/coupling adapter mechanisms 20 and 30 with their corresponding body or frame component should be understood as applicable to either of machines 10a or 10b. Further still, the present description of individual mounting elements, such as mounting element 18a or mounting element 16a of machine 10a should be understood to refer to their counterpart mounting elements 18b and 16b on the other machine 10b.

In the embodiment shown in FIG. 3, a first connecting interface 70a of adapter mechanism 30 corresponds with mounting elements 18a and 18b, whereas a second connecting interface 70b of adapter mechanism 30 corresponds with suspension element 40 but does not correspond with suspension elements 50. In one embodiment, each of connecting interfaces 70a and 70b may include apertures formed in an adapter plate 33, whereas in other embodiments, the connecting interfaces might comprise pins, bosses, or other structural features. Adapter plate 33 may have a plurality of lobes 61 which each include an aperture 63 therein. A plurality of cutouts 81 alternate with lobes 61. In one embodiment, a set of fasteners 31 each with a corresponding washer 32 may be used to couple adapter plate 33 with frame 12a. It may further be noted that mounting element 18a includes a set of apertures 71a which register with apertures 63 to enable fasteners 31 to extend through frame 12a. Apertures 71a might comprise threaded bores configured to threadedly receive fasteners 31, or bolts, etc. might be used which couple with nuts in other embodiments. Mounting element 18b may include counterpart apertures 71b. A nut 35 is further provided which is configured to engage with suspension element 40 for attaching suspension element 40 with adapter plate 33 and hence frame 12a. Another washer 39 may be placed between suspension element 40 and adapter plate 33.

A plurality of pins 34 are further provided which are received in yet another set of apertures 72a. A support plate 36 is provided through which another set of fasteners 37 extend for attaching to suspension element 40. Fasteners 37 may extend through pins 34, and yet another set of washers 38 may be positioned between fasteners 37 and plate 36. Mounting element 18a may include a center aperture 73a, whereas mounting element 18b may also include an identical center aperture 73b, further described herein. Apertures 73a and 73b may have a width, shape and/or location which is based on a configuration of suspension elements 40.

By coupling together the various components associated with machine 10a in FIG. 3 in the manner described herein, machine 10a can be adapted such that suspension element 40 is securely mounted to cab 14a, as well as securely mounted to frame 12a despite the fact that mounting element 18a is actually purpose built for suspension elements 50 instead of suspension elements 40. Turning to the components illustrated in connection with machine 10b in FIG. 3, it will be noted that suspension element 50 couples directly with frame 12b and couples with cab 14b by way of an adapter mechanism 20. Suspension element 50 may include a plate element 52a, a first mount portion 51a comprising a disk-shaped element of vibration isolating material such as an elastomeric material, and a second mount portion 51b similar to mount portion 51a, as well as a second plate element 52b. Mount portions 51a and 51b may be positioned on opposite sides of frame 12b, and a pin 54 may be provided which extends through aperture 73b in frame 12b and couples with each of mount portions 51a and 51b. A fastener 55 such as a bolt may also be provided which extends through each of plate elements 52a and 52b, as well as mount portions 51a and 51b. A washer 53 may be positioned about fastener 55. Mounting element 18b may have a configuration corresponding with mount 50, in particular aperture 72b may have a configuration identical to aperture 72a and be located identically in frame 12b to that of aperture 72a in frame 12a. In one embodiment, the width, shape and/or location of apertures 73a and 73b may be based on a width of mount portions 51a and 51b.

Also shown in FIG. 3 is adapter mechanism 20, which is used to couple suspension element 50 with operator cab 14a. It will be noted that adapter mechanism 20 includes a first connecting interface 80a which corresponds with mounting element 16b, but does not correspond with mounting elements 18a, 18b, and a second connecting interface 80b which corresponds with suspension element 50 but does not correspond with suspension element 40. Similar to the foregoing description of adapter mechanism 30, connecting interfaces 80a and 80b may comprise apertures formed on opposite sides of adapter plate 22, pins, bosses, or other structural features.

In one embodiment, mounting element 16b may include a center aperture 62b having a configuration identical to aperture 62a of mounting element 16a. As such, mounting element 16b does not have a configuration which corresponds with suspension element 50. To mate suspension element 50 with cab 14b, an adapter plate 22 of adapter mechanism 20 may be coupled with cab 14b via a set of fasteners 23. Washers 24 may be positioned between fasteners 23 and adapter plate 22. In one embodiment, connecting interface 80a may include a set of apertures 27 formed in adapter plate 22 which register with another set of apertures 61b formed in cab 14b. Adapter plate 22 may further include a peg 25 which extends into aperture 62b. Peg 25 may be configured to locate adapter plate 22 relative to operator cab 14b, but will typically have a width less than a width of aperture 62b. Connecting interface 80b may include an internally threaded bore 26 which receives fastener 55 for coupling suspension element 50 therewith.

In one embodiment, certain of the components of suspension elements 40 or 50 and adapter mechanisms 30 or 20 may be provided in the form of a kit for replacing a suspension element of a machine which couples between a body component such as one of operator cabs 14a or 14b and a frame component such as one of frames 12a or 12b. Over time, suspension elements may wear out, or a machine owner may wish to upgrade to a different type of suspension element, such as upgrading from non-viscous mounts to viscous mounts. For this purpose, one or more kits may be used to swap out one or more old suspension elements for one or more replacement suspension elements. The kit may include one of suspension elements 40 or 50, or some other vibration isolation device, and one of adapter mechanisms 20 or 30. In one example embodiment, two different types of kits may be made available, one for a first type of suspension elements 40, and the other for a second type of suspension elements 50.

INDUSTRIAL APPLICABILITY

Referring to FIGS. 1-3 generally, making machines according to the present disclosure will typically commence by providing at least one machine frame component and at least one machine body component. Where applied in the context of wheel loaders, a frame component such as one of frames 12a and 12b may be provided and a body component such as one of cabs 14a and 14b. Although each of machines 10a and 10b is shown having their corresponding implement systems 19a, 19b mounted on frames 12a and 12b as well as their ground engaging wheels 15a, 15b, in some embodiments these components will be mounted on frames 12a and 12b after mounting the corresponding cabs 14a, 14b thereon. It should still further be appreciated that making machines as contemplated herein need not take place during original manufacturing. For example, many machines such as wheel loaders have a relatively long service life. Periodically, such machines are serviced and various of the components thereof inspected, cleaned, replaced if necessary, etc. Replacing suspension elements in the manner described herein could meet the intended definition of "making" a machine.

In any event, once at least one frame component such as frame 12a is made available, and at least one body component such as operator cab 14a is also made available, suspension elements of a desired type may be selected for use in making the corresponding machine 10a. In the illustrated embodiment, suspension elements 40, comprising viscous mounts, are selected for use in making machine 10a. It will be appreciated of course that suspension elements 40 might also be used, or another type of suspension elements altogether such as mounts of the type known in the art as "bushing mounts." If suspension elements 40 are selected, suspension elements 40 may be coupled with mounting elements 16a on operator cab 14a, mounting elements 16a having a configuration, for example at least one aperture such as aperture 62a, which corresponds with suspension elements 40 as described herein.

Once suspension elements 40 are selected, and actually obtained, operator cab 14a may be coupled with frame 12a at least in part by coupling frame 12a with suspension elements 40 by way of adapter mechanisms 30. Operator cab 14a is then lowered onto frame 12a and the necessary connections made to secure them together. In one embodiment, suspension elements 40 may be coupled with frame 12a first, then operator cab 14a lowered onto suspension elements 40. In such an embodiment, it may be desirable to attach suspension elements 40 with frame 12a relatively loosely at first, then tighten the respective connections, e.g. fasteners 31 once operator cab 14a is positioned on suspension elements 40. In another embodiment, suspension elements 40 may be coupled with operator cab 14a prior to positioning operator cab 14a on frame 12a. Subsequent to making a first machine such as machine 10a, a second machine such as machine 10b may be made, selecting mounts 50 for use therewith.

The present disclosure is considered to provide substantial advantages over state of the art strategies by imparting flexibility in making machines which are similar, but where different hardware options are desired. Whereas earlier approaches often relied on different purpose built frames, cabs, etc., corresponding to different hardware options, the present disclosure enables the use of identical base components, which are adapted to accommodate different suspension elements by way of relatively simple adapter mechanisms using a relatively small number of parts. In addition, the strategies contemplated herein for mounting the respective suspension elements are considered to provide a relatively robust interface between the cabs and frames.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. For instance, while it is contemplated that making a plurality of machines according to the present disclosure might include using machines with identical body components and identical frame components, the present disclosure is not thereby limited. In other embodiments, the principles set forth herein might be used where a variety of different cabs are available, all with mounting elements configured for coupling with a certain type of suspension elements. In such an embodiment, making a machine might include not only selecting suspension elements, but also selecting cab type. Other aspects, features and advantages will be apparent upon an examination of the attached drawings and appended claims.

What is claimed is:

1. A group of machines comprising:
   a first machine set which includes at least one machine having a first body component, a first frame component and suspension elements of a first type coupled between the first body component and the first frame component; and
   a second machine set which includes at least one other machine having a second body component and a second frame component, said at least one other machine including suspension elements of a second, different type coupled between the second body component and the second frame component;
   wherein each of said first and second body components includes mounting elements having a configuration corresponding to the first type of suspension elements but not the second type, and each of said first and second frame components includes mounting elements with a configuration corresponding to the second type of suspension elements but not the first type, and wherein each of said machines further includes adapter mechanisms configured to mate one of the respective body component and frame component with the suspension elements coupled therebetween.

2. The group of machines of claim 1 wherein:
   the adapter mechanisms of said first machine set have a first connecting interface which corresponds with the mounting elements of the first body component but not the first frame component and a second connecting interface which corresponds with the first type of suspension elements but not the second type of suspension elements; and
   the adapter mechanisms of said second machine set have a third connecting interface which corresponds with the mounting elements of the second frame component but not the mounting elements of the second body component and a fourth connecting interface which corresponds with the second type of suspension elements but not the first type of suspension elements.

3. The group of machines of claim 2 wherein said first and second body components comprise identical operator cabs, and wherein said first and second frame components comprise identical machine frames each having ground engaging propulsion elements coupled therewith.

4. The group of machines of claim 3 wherein:
the mounting elements of said first and second body components each comprise at least one aperture having a location and diameter which is based on a configuration of the first type of suspension elements; and
the mounting elements of said first and second frame components each comprise at least one aperture having a location and diameter which is based on a configuration of the second type of suspension elements.

5. The group of machines of claim 3 wherein each of said adapter mechanisms includes an adapter plate, and wherein each of the adapter plates has apertures registering with the at least one aperture of the mounting element of the corresponding body component or frame component.

6. The group of machines of claim 5 wherein the first type of suspension elements comprise one of viscous mounts and non-viscous mounts and the second type of suspension elements comprise the other of viscous mounts and non-viscous mounts.

7. The group of machines of claim 4 wherein:
the adapter mechanisms of said first machine set include an adapter plate having a plurality of lobes each with an aperture therein which is configured to receive a fastener for coupling the adapter plate with the first body component or the first frame component, and a plurality of cutouts alternating with said plurality of lobes; and
the adapter mechanisms of said second machine set each include an adapter plate having a plurality of apertures therein each configured to receive a fastener for coupling the adapter plate with the second body component or the second frame component and a peg with an internally threaded bore.

8. The group of machines of claim 1 wherein said first machine set and said second machine set each comprise at least one wheel loader.

* * * * *